W. B. KILBOURNE.
HOSE-COUPLING.

No. 189,941.  Patented April 24, 1877.

UNITED STATES PATENT OFFICE.

WILLIAM B. KILBOURNE, OF AUBURN, MAINE.

IMPROVEMENT IN HOSE-COUPLINGS.

Specification forming part of Letters Patent No. 189,941, dated April 24, 1877; application filed February 17, 1877.

*To all whom it may concern:*

Figure 1:
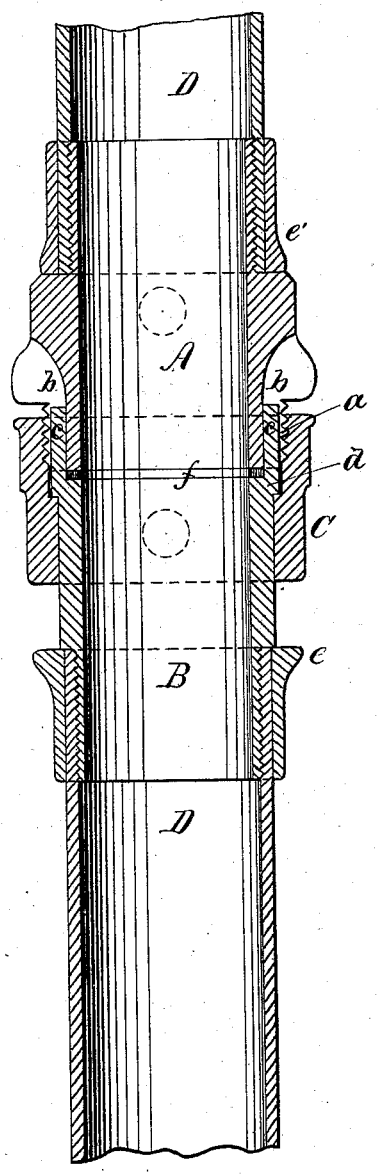
Figure 2:
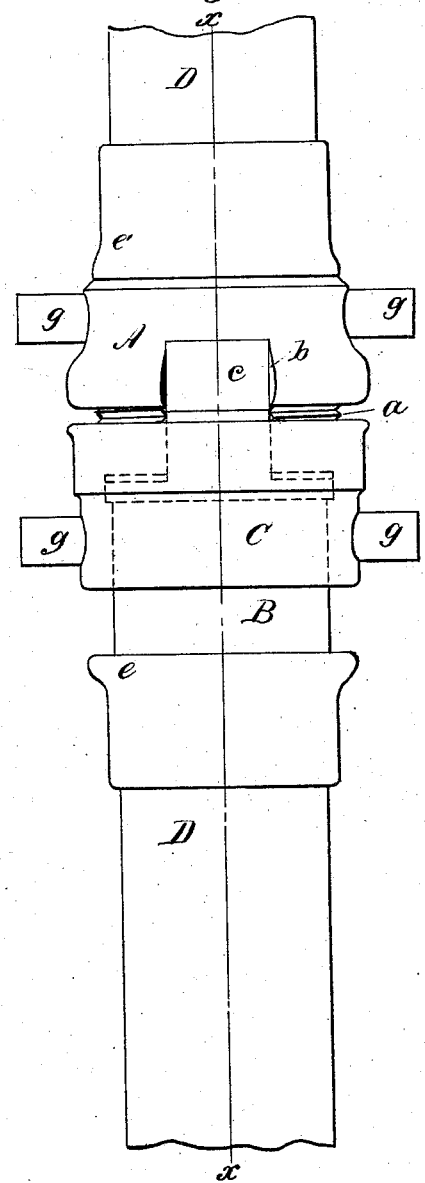

Be it known that I, WILLIAM B. KILBOURNE, of Auburn, in the county of Androscoggin and State of Maine, have invented a new and Improved Hose-Coupling, of which the following is a specification:

Figure 1 is a longitudinal section on line $x$ $x$ in Fig. 2. Fig. 2 is a side elevation.

Similar letters of reference indicate corresponding parts.

The object of the invention is to provide a hose-coupling that may be readily united, which is not liable to clog so as to prevent it from being quickly put together, and in which the threads cannot be crossed, and thus to obviate the common and annoying difficulties experienced in using couplings of ordinary construction.

Referring to the drawing, A is the male portion of the coupling, which is threaded externally at $a$, and is recessed at opposite sides $b$, to receive projections or lugs $c$ formed on the part B of the coupling. The part B is flanged at $d$, and is of a uniform size from this point to the collar $e$. Upon this part, between the flange $d$ and collar $e$, a sleeve, C, is placed, which is recessed to receive the flange $d$, and is threaded internally to fit the thread cut on the part A.

The sleeve C is capable of sliding backward to the collar $e$, permitting the easy adjustment of the parts of the coupling before screwing it together.

An ordinary packing-ring or gasket, $f$, is placed in a recess in the part B.

The hose D is attached to the ends of the coupling by placing on it the collar $e$ and screwing the threaded end of the coupling into the end of the hose thus re-enforced.

The operation is as follows: The lugs of the part B are placed in the recesses in the part A, and the parts of the coupling guided by the lugs $c$ are brought squarely together. The sleeve C is then moved forward and screwed onto the threads $a$ of the part A with the hands, or by means of a spanner placed on the lugs $g$.

The advantages claimed for my improved coupling are, that it is easily and quickly put together or taken apart. It is strong, durable, and not liable to injury. The threaded parts are guided, so that they may be put together in the dark, and it is impossible to cross the thread.

Having thus described my invention, I claim as new and desire to secure by Letters Patent—

The threaded part A $a$, oppositely recessed at $b$, and the flanged part B $d$, oppositely lugged at $c$, in combination with a revolving screw-sleeve, C, that slides back as well as forward, to allow the parts to be slid together without hinderance.

WILLIAM BATES KILBOURNE.

Witnesses:
WALLACE K. OAKES,
SILVESTER OAKES.